United States Patent

Zink

[11] Patent Number: 4,847,378
[45] Date of Patent: Jul. 11, 1989

[54] CHROMOGENIC POLYCYCLIC AZAMETHINES

[75] Inventor: Rudolf Zink, Therwil, Switzerland

[73] Assignee: Ciba-Geigy Corporation, Ardsley, N.Y.

[21] Appl. No.: 188,807

[22] Filed: May 2, 1988

[30] Foreign Application Priority Data

May 11, 1987 [CH] Switzerland ............... 1792/87

[51] Int. Cl.$^4$ .................................. C07D 487/04
[52] U.S. Cl. ........................ 544/252; 544/230; 544/246; 548/302
[58] Field of Search .............. 544/230, 246, 252; 548/302

[56] References Cited

FOREIGN PATENT DOCUMENTS 1101442 7/1984 U.S.S.R. .

Primary Examiner—Richard L. Raymond
Attorney, Agent, or Firm—Kevin T. Mansfield; Edward McC. Roberts

[57] ABSTRACT

Chromogenic polycyclic azamethines of formula

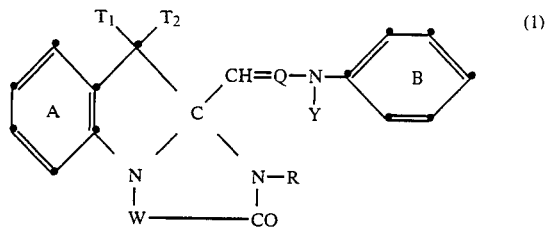

wherein
- $T_1$ and $T_2$ are each independently of the other lower alkyl, cycloalkyl, benzyl, or, when taken together, are alkylene,
- Q is —CH or, preferably, N,
- W is alkylene, alkenylene, 1,2-cycloalkylene or 1,2-arylene,
- R is hydrogen, lower alkyl, aryl or aralkyl, and
- Y is alkyl or alkenyl, each unsubstituted or substituted by halogen, hydroxyl, cyano or lower alkoxy, or is aralkyl, and the ring A is unsubstituted or substituted by halogen, cyano, hydroxy, lower alkyl, lower alkoxy, lower alkylcarbonyl, lower alkylcarbonyloxy, lower alkylamino, di-lower alkylamino or lower alkylcarbonylamino, and the ring B is unsubstituted or substituted by halogen, cyano, $C_1$–$C_{12}$alkyl, $C_1$–$C_{12}$alkoxy, $C_2$–$C_{12}$alkoxyalkoxy or aralkoxy or a glycol ether group.

These azamethines are particularly suitable for use as color formers in pressure-sensitive or heat-sensitive recording materials and give strong and lightfast yellow and orange colorations.

13 Claims, No Drawings

CHROMOGENIC POLYCYCLIC AZAMETHINES

The present invention relates to chromogenic polycyclic azamethines, to the preparation thereof, and to the use thereof as colour formers in pressure-sensitive or heat-sensitive recording materials.

The novel azamethines have the general formula

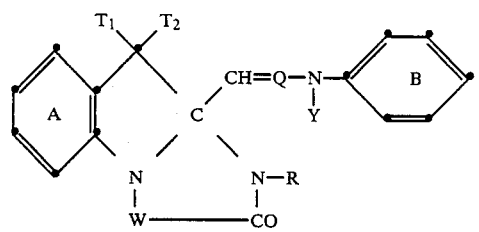

wherein
$T_1$ and $T_2$ are each independently of the other lower alkyl, cycloalkyl, benzyl, or, when taken together, are alkylene,
Q is CH or, preferably, N,
W is alkylene, alkenylene, 1,2-cycloalkylene or 1,2-arylene,
R is hydrogen, lower alkyl, aryl or aralkyl, and
Y is alkyl or alkenyl of not more than 12 carbon atoms, each unsubstituted or substituted by halogen, hydroxyl, cyano or lower alkoxy, or is aralkyl, and the ring A is unsubstituted or substituted by halogen, cyano, hydroxy, lower alkyl, lower alkoxy, lower alkylcarbonyl, lower alkylcarbonyloxy, lower alkylamino, di-lower alkylamino or lower alkylcarbonylamino, and the ring B is unsubstituted or substituted by halogen, cyano, $C_1$–$C_{12}$alkyl, $C_1$–$C_{12}$alkoxy, $C_2$–$C_{12}$alkoxyalkyl, $C_2$–$C_{12}$alkoxyalkoxy or aralkoxy.

Lower alkyl and lower alkoxy normally denote groups or moieties that contain 1 to 5, preferably 1 to 3, carbon atoms, and are typically methyl, ethyl, propyl, isopropyl, sec-butyl, tert-butyl, amyl or isoamyl and, respectively, methoxy, ethoxy, isopropoxy, tert-butoxy or tert-amyloxy.

Halogen is typically fluorine, bromine or, preferably, chlorine.

Cycloalkyl radicals $T_1$ and $T_2$ are, for example, cyclopentyl or, preferably, cyclohexyl.

Where $T_1$ and $T_2$ together are an alkylene radical, said radical preferably contains 4 or 5 carbon atoms and, together with the linking nitrogen atom, forms a cyclopentane or cyclohexane ring.

The preferred meaning of $T_1$ and $T_2$ is lower alkyl and, most preferably, both are methyl.

An alkylene radical W preferably contains 1 to 4 carbon atoms and can be straight chain or branched and is, for example, the —CH$_2$, —CH$_2$CH$_2$— or $$-\text{CH}-\text{CH}_2$$
$$|$$
$$\text{CH}_3$$

group. As alkenylene, W is preferably —CH=CH—.

A cycloalkylene group W is preferably the 1,2-cyclohexylene group.

As arylene, W is preferably a benzene ring which is unsubstituted or substituted by halogen, methyl or methoxy.

The preferred meaning of W is 1,2-phenylene, 1,2-cyclohexylene, methylene, isopropylene or, in particular, ethylene (—CH$_2$CH$_2$—).

The N-substituent R is preferably hydrogen. R may also suitably be methyl or aryl. R as aryl or aralkyl is preferably phenyl, tolyl, chlorophenyl, benzyl or phenethyl.

Alkyl and alkenyl radicals Y may be straight chain or branched and are, for example, methyl, ethyl, n-propyl, isopropyl, n-butyl, sec-butyl, amyl, isoamyl, n-hexyl, 2-ethyl-n-hexyl, octyl, isooctyl or n-dodecyl and, respectively, vinyl, allyl, 2-methylallyl, 2-ethylallyl, 2-butenyl or octenyl.

Y as aralkyl may be phenethyl, p-chlorobenzyl, 2,4-dimethylbenzyl or, preferably, benzyl. If the alkyl moiety is substituted, then Y is preferably cyanoalkyl, haloalkyl, hydroxyalkyl or alkoxyalkyl preferably containing a total of 2 to 8 carbon atoms. Examples of such substituted radicals are: β-cyanoethyl, β-chloroethyl, β-hydroxyethyl, β-methoxyethyl, β-ethoxyethyl or a chlorohydrin group.

The preferred meaning of Y is methyl, ethyl, allyl, octyl or benzyl.

The ring A preferably does not contain further substituents or is further substituted by halogen, cyano, lower alkyl, lower alkoxycarbonyl, for example by chlorine, methyl, methoxy or carbomethoxy.

If the ring B is substituted, then preferred substituents are halogen, cyano, $C_1$–$C_{12}$alkyl, $C_1$–$C_{12}$alkoxy, $C_2$–$C_6$alkoxyalkyl, $C_2$–$C_5$hydroxyalkyl, aralkoxy such as benzyloxy, or a glycol ether group such as —O—(CH$_2$CH$_2$O)$_m$—R', wherein R' is hydrogen, phenyl, benzyl or lower alkyl, and m is 1 to 5, preferably 1 or 2.

Useful chromogenic polycyclic azamethines are those of formula

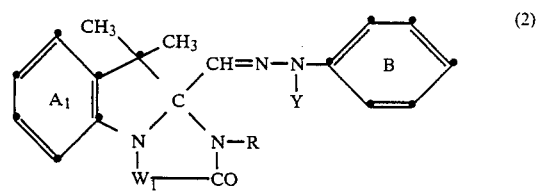

wherein the ring $A_1$ is unsubstituted or is substituted by halogen, cyano, lower alkyl or lower alkoxy, $W_1$ is ethylene, isopropylene, 1,2-cyclohexylene or 1,2-phenylene, and R, Y and B have the given meanings.

Among the azamethines of formula (2), those compounds are preferred in which the ring $A_1$ is unsubstituted or is substituted by halogen, lower alkyl or lower alkoxy. In formula (2), $W_1$ is preferably isopropylene or, most preferably, ethylene.

Particularly interesting azamethines are those of formula

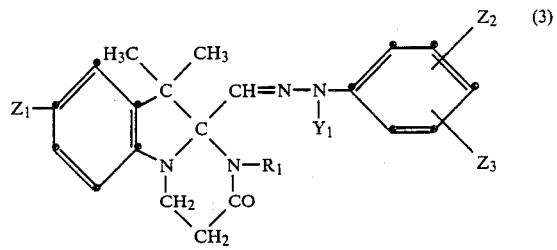

wherein
$R_1$ is hydrogen, lower alkyl, phenyl or chlorophenyl,
$Y_1$ is $C_1$–$C_8$alkyl, allyl, benzyl or phenethyl,
$Z_1$ is hydrogen, halogen, $C_1$–$C_3$alkoxy or $C_1$–$C_4$alkyl,
$Z_2$ is hydrogen, cyano, halogen, $C_1$–$C_5$alkoxy, $C_2$–$C_8$alkoxyalkoxy or $C_1$–$C_{12}$alkyl, and
$Z_3$ is hydrogen, halogen, $C_1$–$C_5$alkoxy or $C_1$–$C_5$alkyl.

Particularly preferred azamethines are those of formula

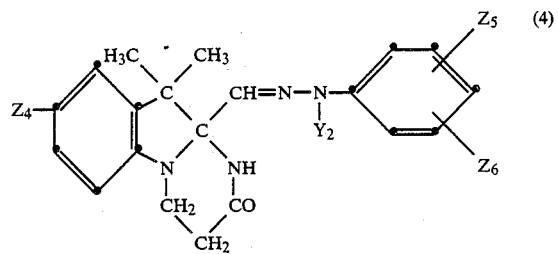

wherein
$Y_2$ is methyl, ethyl, N-octyl, allyl or benzyl,
$Z_4$ is hydrogen or chlorine,
$Z_5$ is hydrogen, chlorine, $C_1$–$C_4$alkoxy, $C_2$–$C_8$alkoxyalkoxy or $C_1$–$C_{12}$alkyl, and
$Z_6$ is hydrogen, chlorine or methyl.

The polycyclic azamethines of formula (1) are prepared by reacting a quaternary ammonium salt of formula

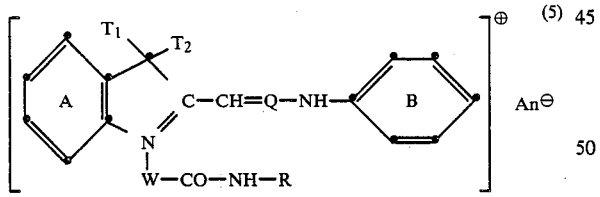

wherein $An^\ominus$ is the anion of an inorganic or organic acid and A, B, Q, R, $T_1$, $T_2$ and W have the given meanings, with an alkylating agent that introduces the radical Y and is unsubstituted or substituted by an aryl radical, and cyclising the resultant compound to the polycyclic azamethine of formula (1).

The process is conveniently carried out in alkaline medium, in water as well as in an organic solvent that does not participate in the condensation reaction, and in the presence of an alkali compound, for example a hydroxide, carbonate or bicarbonate of an alkali metal, ammonium hydroxide, ammonium carbonate, ammonium bicarbonate or magnesium oxide. The alkylation or aralkylation is preferably carried out in the pH range from 7.5 to 9, whereas the cyclisation is carried out preferably at an elevated pH value in the range from 9.5 to 12.5.

The alkylation as well as the cyclisation can be carried out in the temperature range from 30° to 50° C. In certain cases, and especially when using aralkylating agents and organic solvents, it is necessary to employ higher temperatures, preferably in the range from 70° to 150° C.

The reaction time depends on the temperature and is generally from 2 to 15 hours, preferably from 3 to 6 hours.

Suitable organic solvents as reaction medium are cycloaliphatic or, preferably, aromatic hydrocarbons such as cyclohexane, benzene, toluene or xylene; chlorinated hydrocarbons such as ethylene chloride, tetrachloroethylene or chlorobenzenes, for example chlorobenzene, chlorotoluene or dichlorobenzene; cyclic ethers such as dioxane or tetrahydrofuran; dimethyl sulfoxide or nitriles of aliphatic monocarboxylic acids, for example acetonitrile, propionitrile or butyronitrile. It is also possible to use mixtures of the cited solvents. Preferred solvents are chlorobenzene, chlorotoluene and, in particular, toluene.

The starting materials of formula (5) can be prepared in a manner known per se. A preferred process comprises coupling a couplable heterocyclic compound of formula

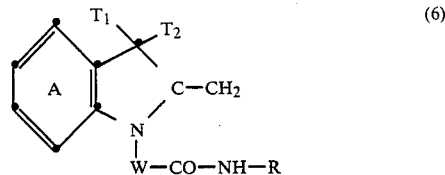

with a diazonium salt of an aniline compound of formula

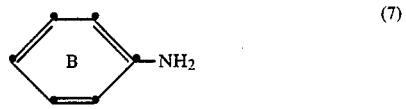

in which formulae (6) and (7) above the substituents A, B, $T_1$, $T_2$, W and R have the given meanings.

Suitable alkylating agents for the reaction with the starting materials of formula (5) are alkyl halides, for example, methyl, ethyl or allyl iodide, methyl, ethyl or allyl bromide, or methyl, ethyl or allyl chloride, or dialkyl sulfates such as dimethyl sulfate or diethyl sulfate. Particularly suitable aralkylating agents are benzyl chloride and the corresponding substitution products such as p-chlorobenzyl chloride or 2,4-dimethylbenzyl chloride, which are preferably employed in a non-polar organic solvent such as benzene, toluene or xylene.

An alternative process for the preparation of the azamethines of formula (1), wherein R is lower alkyl, aryl or aralkyl, comprises reacting a compound of formula

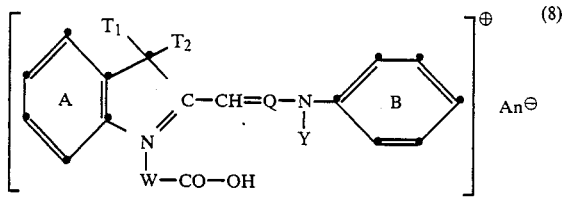

(8)

wherein A, B, Q, T$_1$, T$_2$, W, Y and An$^\ominus$ have the given meanings, with an amine of formula R—NH$_2$ (9) in the presence of phosphoroxy chloride or thionyl chloride, to form the acid chloride as intermediate.

The reaction is conveniently carried out in an organic solvent. Examples of suitable solvents are: cycloaliphatic or aromatic hydrocarbons such as cyclohexane, benzene, toluene or xylene; chlorinated hydrocarbons such as chloroform, ethylene chloride or chlorobenzenes, preferably dichlorobenzene; ethers such as diethyl ether or glycol dimethyl ether; cyclic ethers such as dioxane or tetrahydrofuran.

The closure of the lactam ring is carried out at elevated temperature and in the presence of an acid acceptor, for example a hydroxide or carbonate of an alkali metal.

The starting materials of formula (8) can be obtained by treatment of azamethines of formula (1), wherein R is hydrogen, with an inorganic acid, for example sulfuric acid or phosphoric acid, and at elevated temperature, for example in the range from 50° to 100° C.

The azamethines of formulae (1) to (4) are normally colourless or, at most, faintly coloured. When these sublimation-fast colour formers are brought into contact preferably with an acid developer, e.g. an electron acceptor, they produce strong yellow or orange shades of excellent light fastness. They are therefore also very useful when combined with one or more other known colour formers, for example 3,3-(bisaminophenyl)phthalides, 3,3-(bisindolyl)phthalides, 3-indolyl-3-aminophenylazaphthalides, 3-aminofluoranes, 2,6-diaminofluoranes, leucoauramines, spiropyranes, spirodipyranes, phenoxazines, phenothiazines, carbazolylmethanes or other triarylmethaneleuco dyes, to give green, navy-blue, grey or black colorations.

The azamethines of formulae (1) to (4) exhibit on phenolic substrates, as well as in particular on activated clays and substituted zinc salicylates, an excellent colour intensity and lightfastness. They are particularly suitable as colour formers for use in a heat-sensitive, or especially in a pressure-sensitive, recording material when can also be a copying material. They are distinguished by the property of having excellent fastness to sublimation and of exhibiting a slight decrease in colour strength (CB decline) after exposure on a CB sheet.

A pressure-sensitive material consists, for example, of at least one pair of sheets which contain at least one colour former of formulae (1) to (4), dissolved in an organic solvent, and an electron acceptor as developer.

Typical examples of such developers are activated clays such as attapulgite, acid clay, bentonite, montmorillonite; activated clay such as acid-activated bentonite or montmorillonite; and also zeolith, halloysite, silica, alumina, aluminium sulfate, aluminium phosphate, zinc chloride, zinc nitrate, kaolin or any clay or acidic organic compound, for example unsubstituted or ring-substituted phenols, salicylic acid or salicylates and their metal salts, or an acidic polymer, for example a phenolic polymer, an alkylphenol acetylene resin, a maleic acid/-rosin resin or a partially or completely hydrolysed polymer of maleic anhydride and styrene, ethylene or vinyl methyl ether, or carboxypolymethylene. Mixtures of these polymers can also be used. Preferred developers are acid-activated bentonite, zinc salicylates, or the condensates of p-substituted phenols with formaldehyde. These last mentioned compounds may also contain zinc.

The developers may also be used in admixture with other basically inert or substantially inert pigments or with other auxiliaries such as silica gel or UV absorbers, e.g. 2-(2-hydroxyphenyl)benzotriazoles. Examples of such pigments are: talcum, titanium dioxide, zinc oxide, chalk, clays such as kaolin, as well as organic pigments, e.g. urea/formaldehyde condensates (BET surface area: 2–75 m$^2$/g) or melamine/formaldehyde condensates.

The colour former effects a coloured mark at those points where it comes into contact with the electron acceptor. To prevent the colour formers contained in the pressure-sensitive recording material from becoming active prematurely, they are usually separated from the electron acceptor. This separation can conveniently be accomplished by incorporating the colour formers in foam-like, sponge-like or honeycomb-like structures. The colour formers are preferably encapsulated in microcapsules, which can normally be ruptured by pressure.

When the capsules are ruptured by pressure, for example with a pencil, the colour former solution is transferred to an adjacent sheet which is coated with an electron acceptor and a coloured area is thus produced. This colour results from the dye which is formed and which is absorbed in the visible range of the electromagnetic spectrum.

The colour formers are encapsulated preferably in the form of solutions in organic solvents. Examples of suitable solvents are preferably non-volatile solvents, for example a polyhalogenated paraffin such as chloroparaffin, or a polyhalogenated diphenyl such as monochlorodiphenyl or trichlorodiphenyl, and also tricresyl phosphate, di-n-butyl phthalate, dioctyl phthalate, trichlorobenzene, trichloroethylphosphate, an aromatic ether such as benzylphenyl ether, a hydrocarbon oil such as paraffin or kerosene, an alkylated (e.g. containing isopropyl, isobutyl, sec- or tert-butyl groups) derivative of diphenyl, naphthalene or terphenyl; dibenzyl toluene, terphenyl, partially hydrogenated terphenyl, a benzylated xylene, or other chlorinated or hydrogenated condensed aromatic hydrocarbons. Mixtures of different solvents, especially mixtures of paraffin oils or kerosene and diisopropylnaphthalene or partially hydrogenated terphenyl, are often used to obtain optimum solubility of the colour formers, a rapid and intense coloration, and a viscosity which is advantageous for the microencapsulation.

The capsule walls can be formed evenly around the droplets of the colour former solution by coacervation; and the encapsulating material may consist of gelatin and gum arabic, as described e.g. in U.S. Pat. No. 2 800 457. The capsules can also be formed conveniently from an aminoplast or a modified aminoplast by polycondensation, as described in British patent specification Nos. 989 264, 1 156 725, 1 301 052 and 1 355 124. Also suitable are microcapsules which are formed by interfacial polymerisation, e.g. capsules formed from polyester, polycarbonate, polysulfonamide, polysulfonate, but in particular from polyamide or polyurethane.

The microcapsules containing the colour formers of formula (1) can be used for the production of a wide variety of known kinds of pressure-sensitive copying material. The various systems differ substantially from one another in the arrangement of the capsules, of the colour reactants, and of the support. A preferred arrangement is that in which the encapsulated colour former is in the form of a layer on the back of a transfer sheet and the developer is in the form of a layer on the face of a receiver sheet.

Another arrangement of the components is that wherein the microcapsules which contain the colour former, and the developer, are in or on the same sheet in the form of one or more individual layers, or are present in the paper pulp.

The capsules are preferably secured to the support by means of a suitable adhesive. As paper is the preferred support, these adhesives are principally paper-coating agents, for example gum arabic, polyvinyl alcohol, hydroxymethylcellulose, casein, methyl cellulose, dextrin, starch or starch derivatives or polymer latices. These latter are e.g. butadiene/styrene copolymers or acrylic homopolymers or copolymers.

The paper employed comprises not only normal paper made from cellulose fibres, but also paper in which the cellulose fibres are replaced (partially or completely) by synthetic polymers.

The compounds of formulae (1) to (4) can also be employed as colour formers in a thermoreactive recording material. This recording material usually contains at least one carrier, one colour former, one electron acceptor, and optionally also a binder and/or wax.

Thermoreactive recording systems comprise, for example, heat-sensitive recording or copying materials or papers. These systems are used e.g. for recording information, for example in electronic computers, teleprinters or telewriters, or in recording and measuring instruments, e.g. electrocardiographs. The image (mark) formation can also be effected manually with a heated pen. Laser beams can also be used to produce heat-induced marks.

The thermoreactive recording material can be composed such tnat the colour former is dispersed or dissolved in one binder layer and the developer is dissolved or dispersed in the binder in a second layer. Another possibility comprises dispersing both the colour former and the developer in one layer. By means of heat the binder is softened at specific areas and the colour former comes into contact with the developer (electron acceptor) at those points where heat is applied and the desired colour develops at once.

Suitable developers are the same electron acceptors as are used in pressure-sensitive papers. Examples of developers are the clays already mentioned and especially phenolic resins, or also the phenolic compounds disclosed e.g. in German Offenlegungsschrift No. 1 251 348, for example 4-tert-butylphenol, 4-phenylphenol, methylene bis(p-phenylphenol), 4-hydroxydiphenyl ether, α-naphthol, β-naphthol, 4-hydroxydiphenylsulfone, 4-hydroxy-4'-methyldiphenylsulfone, methyl or benzyl 4-hydroxybenzoate, 4-hydroxyacetophenone, 2,2'-dihydroxydiphenyl, 4,4'-cyclohexylidenediphenol, 4,4'-isopropylidenediphenol, 4,4'-isopropylidene-bis(2-methylphenol), an antipyrine complex of zinc thiocyanate, a pyridine complex of zinc thiocyanate, 4,4'-bis(-hydroxyphenyl)valeric acid, hydroquinone, pyrogallol, phloroglucinol, p-, m- and o-hydroxybenzoic acid, gallic acid, 1-hydroxy-2-naphthoic acid, as well as boric acid or organic, preferably aliphatic, dicarboxylic acids, for example tartaric acid, oxalic acid, maleic acid, citric acid, citraconic acid or succinic acid.

It is preferred to use fusible, film-forming binders for making the thermoreactive recording material. These binders are normally water-soluble, whereas the azamethines and the developer are sparingly soluble or insoluble in water. The binder should be able to disperse and fix the colour former and the developer at room temperature.

When heated, the binder softens or melts, so that the colour former comes in contact with the developer and a colour is able to form. Examples of binders which are soluble, or at least swellable, in water are hydrophilic polymers, such as polyvinyl alcohol, polyacrylic acid, hydroxyethylcellulose, methyl cellulose, carboxymethylcellulose, polyacrylamide, polyvinyl pyrrolidone, carboxylated butadiene/styrene copolymers, gelatin, starch or etherified corn starch.

If the colour former and the developer are in two separate layers, it is possible to use water-insoluble binders, i.e. binders which are soluble in non-polar or only weakly polar solvents, for example natural rubber, synthetic rubber, chlorinated rubber, alkyd resins, polystyrene, styrene/butadiene copolymers, polymethylacrylates, ethyl cellulose, nitrocellulose or polyvinyl carbazole. The preferred arrangement, however, is that in which the colour former and the developer are contained in one layer in a water-soluble binder.

The thermoreactive coatings may contain further auxiliaries. To improve the degree of whiteness, to facilitate the printing of papers, and to prevent the heated pen from sticking, the coatings may contain e.g. talcum, titanium dioxide, zinc oxide, alumina, aluminium hydroxide, calcium carbonate, clays or also organic pigments, for example urea/formaldehyde polymers. To effect the colour formation only within a limited temperature range, it is possible to add substances such as urea, thiourea, diphenyl thiourea, acetamide, acetanilide, benzene sulfanilide, bis(stearoyl)ethylenediamide, stearamide, phthalic anhydride, metal stearates, such as zinc stearates, dimethyl terephthalate, phthalonitrile or other appropriate fusible products which induce the simultaneous melting of the colour former and the developer. Thermographic recording materials preferably contain waxes, e.g. carnauba wax, montan wax, paraffin wax, polyethylene wax, condensates of higher fatty acid amides and formaldehyde, or condensates of higher fatty acids and ethylenediamine.

A further utility of the compounds of formulae (1) to (4) is the formation of a colored image by means of the photocurable microcapsules described e.g. in German Offenlegungsschrift No. 3 247 488.

The invention is illustrated by the following Examples, in which percentages are by weight, unless otherwise indicated.

EXAMPLE 1

15.9 g of 2,3,3-trimethylindolenine are dissolved at 45° C. in 50 g of 100% acetic acid and 1 g of 30% hydrochloric acid. To this solution are added 10 g of acrylamide and the reaction mixture is heated, with stirring, to 110° C. and kept at this temperature for 5 hours. The dark red solution is then poured into 200 g of water and adjusted to pH 10 with 120 ml of a 10N sodium hydroxide solution. The precipitate is subsequently extracted with ethyl acetate and the solvent is distilled off, affording 15 g of a compound of formula

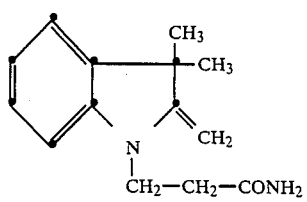

15 g of the compound of formula (i) are dissolved in 105 g of 80% acetic acid and coupling with 6.5 g of a diazotised aniline is effected over 1 hour at 0°–5° C. After stirring for a further hour at 10° C., the reaction mixture is diluted with 200 ml of water and the pH is adjusted to 4.8 by addition of 105 ml of 10N sodium hydroxide solution. The product crystallises out at 20°–25° C. and is isolated by filtration. Recrystallisation from ethanol yields 11 g of a product of formula

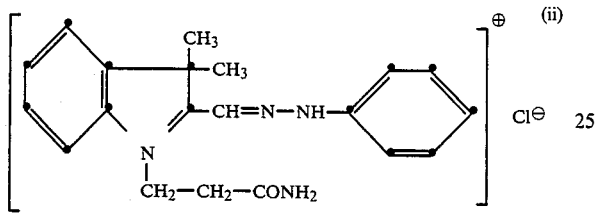

with a melting point of 247°–248° C.

6.1 g of the compound of formula (ii) are suspended at 40° C. in 100 ml of water and to this suspension are added 11.4 g of dimethyl sulfate. The mixture is thereafter stirred for 15 hours at 30°–40° C., while keeping the pH at 7–8 by the dropwise addition of 10N sodium hydroxide solution. The pH is raised to 12 and the precipitated product is isolated by filtration. Recrystallization from toluene yields 3.0 g of a compound of formula

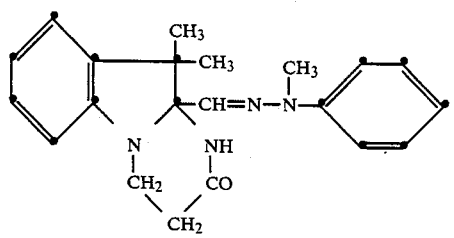

with a melting point of 223°–225° C.

This colour former develops a lightfast yellow colour on acid clay, phenolic resin or zinc salicylate.

EXAMPLE 2

3.7 g of the compound of formula (ii), 30 g of toluene and 1 g of magnesium oxide are made into a slurry at 80° C. and then 2.5 g of benzyl chloride are added. The reaction mixture is heated to 110° C. and stirred for 5 hours at this temperature. The product is precipitated by addition of 40 g of methanol and isolated by filtration. Recrystallisation from isopropanol yields 0.4 g of a colour former of formula

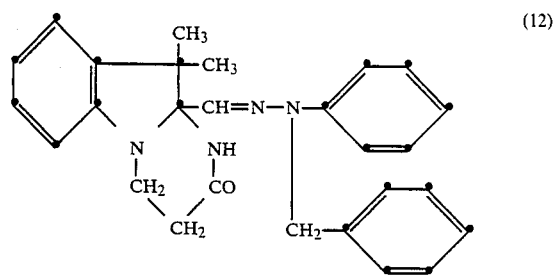

with a melting point of 223°–225° C.

This colour former, which is readily soluble in capsule oil, develops a lightfast yellow colour on acid clay, phenolic resin or zinc salicylate.

The azamethine compounds of formula

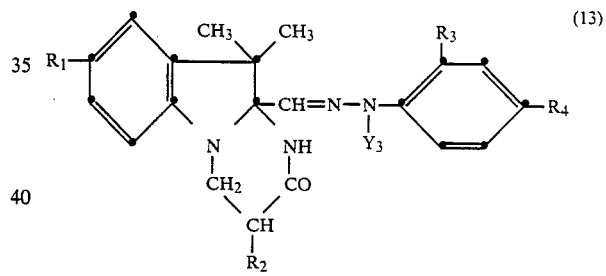

are obtained by using the starting materials listed in the following Table and employing the same procedures as described in Examples 1 and 2.

TABLE

| Ex. | $R_1$ | $R_2$ | $Y_3$ | $R_3$ | $R_4$ | m.p. in °C. | Colour on acid clay |
|---|---|---|---|---|---|---|---|
| 3 | H | $CH_3$ | $CH_3$ | H | H | 212–215 | yellow |
| 4 | H | H | $CH_3$ | H | —n-$C_{12}H_{25}$ | 110–165 | yellow |
| 5 | H | H | $CH_3$ | H | Cl | 265–266 | yellow |
| 6 | Cl | H | $CH_3$ | H | H | 249–250 | yellow |
| 7 | H | H | $CH_3$ | H | —O—$CH_2$—$CH_2$<br>                                   \|<br>$C_3H_7$—O | 186–188 | reddish yellow |
| 8 | H | H | $CH_3$ | $CH_3$ | $CH_3$ | 195–196 | greenish yellow |
| 9 | H | H | $CH_3$ | H | $CH_3$ | 227–229 | yellow |
| 10 | H | H | —n-$C_8H_{17}$ | H | H | 165–166 | yellow |
| 11 | H | H | —n-$C_8H_{17}$ | H | Cl | 168–171 | yellow |
| 12 | H | $CH_3$ | —n-$C_8H_{17}$ | H | H | 152–154 | yellow |
| 13 | H | H | —$CH_2CH$=$CH_2$ | H | H | 208–209 | yellow |
| 14 | Cl | H | $CH_3$ | H | —n-$C_{12}H_{25}$ | 160–161 | yellow |

EXAMPLE 15

Preparation of a pressure-sensitive copying paper

A solution of 3 g of the azamethine of formula (12) in 80 g of diisopropylnaphthalene and 17 g of kerosene are microencapsulated by coacervation in a manner known per se with gelatin and gum arabic. The microcapsules are mixed with starch solution and coated on a sheet of paper. The face of a second sheet of paper is coated with acid-activated bentonite as colour developer. The first sheet and the sheet coated with the developer are laid on top of each other with the coated sides face to face. Pressure is exerted on the first sheet by writing by hand or typewriter and a strong yellow copy of excellent fastness to sublimation and light develops immediately on the sheet coated with the developer. Strong yellow copies which are fast to sublimation and light are also obtained by using the colour former of formula (11) or any of the colour formers of Examples 3 to 14.

EXAMPLE 16

The procedure of Example 15 is repeated, replacing the azamethine of formula (11) by a mixture of the following composition:
1.2 g of 3,3-bis(4'-dimethylaminophenyl)-6-dimethylaminophthalide,
1.2 g of N-butylcarbazol-3-yl-bis(4'-N-methyl-N-phenylaminophenyl)methane,
1.2 g of the azamethine compound of formula (11), and
0.4 g of 3,3-bis(N-octyl-2'-methylindol-3'-yl)phthalide,
to give a pressure-sensitive recording material which gives a strong, lightfast black copy by writing by hand or typewriter.

EXAMPLE 17

1 g of the azamethine of formula (12) is dissolved in 17 g of toluene. With stirring, 12 g of polyvinyl acetate, 8 g of calcium carbonate and 2 g of titanium dioxide are added to this solution. The resultant suspension is diluted with toluene in the weight ratio 1:1 and applied to a sheet of paper with a knife to a thickness of 10 μm. On this sheet of paper is laid a second sheet, the underside of which has been coated to a weight of 3 g/m² with a mixture consisting of 1 part of an amide wax, 1 part of a stearin wax and 1 part of zinc chloride. Pressure is exerted on the top sheet by hand or typewriter and a strong yellow copy which is fast to sublimation and light develops immediately on the sheet coated with the colour former.

EXAMPLE 18

Preparation of a heat-sensitive recording material

In a ball mill, 32 g of 4,4'-isopropylidenediphenol (bisphenol A), 3.8 g of the distearylamide of ethylenediamine, 39 g of kaolin, 20 g of an 88% hydrolysed polyvinyl alcohol and 500 ml of water are ground to a particle size of about 5 μm. In a second ball mill, 6 g of the azamethine of formula (11), 3 g of a 88% hydrolysed polyvinyl alcohol and 60 ml of water are ground to a particle size of about 3 μm. Both dispersions are mixed and applied to paper to a dry coating weight of 5.5 g/m². A strong yellow colour of excellent fastness to light and sublimation is produced by contacting the paper with a heated metal pen. Strong and lightfast yellow copies can also be obtained by using the colour former of formula (12) or any of the other colour formers of Examples 3 to 14.

What is claimed is:
1. A chromogenic polycyclic azamethine of formula

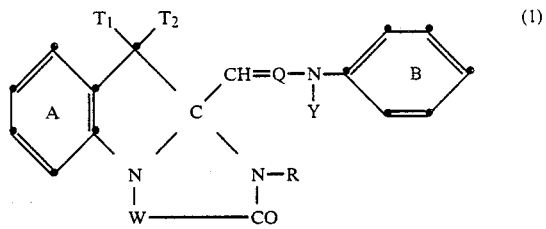

wherein
$T_1$ and $T_2$ are each independently of the other lower alkyl, cycloalkyl, benzyl, or, when taken together, are alkylene,
Q is CH or N,
W is alkylene, alkenylene, 1,2-cycloalkylene or 1,2-arylene,
R is hydrogen, lower alkyl, aryl or aralkyl, and
Y is alkyl or alkenyl of not more than 12 carbon atoms, each unsubstituted or substituted by halogen, hydroxyl, cyano or lower alkoxy, or is aralkyl, and the ring A is unsubstituted or substituted by halogen, cyano, hydroxy, lower alkyl, lower alkoxy, lower alkylcarbonyl, lower alkylcarbonyloxy, lower alkylamino, di-lower alkylamino or lower alkylcarbonylamino, and the ring B is unsubstituted or substituted by halogen, cyano, $C_1$–$C_{12}$alkyl, $C_1$–$C_{12}$alkoxy, $C_2$–$C_{12}$alkoxyalkyl, $C_2$–$C_{12}$alkoxyalkoxy or aralkoxy.

2. An azamethine according to claim 1, wherein $T_1$ and $T_2$ are each lower alkyl.

3. An azamethine according to claim 2, wherein $T_1$ and $T_2$ are methyl.

4. An azamethine according to claim 1, wherein the ring A is unsubstituted or is substituted by halogen, cyano, methyl or methoxy.

5. An azamethine according to claim 1, wherein W is methylene, ethylene, isopropylene, 1,2-cyclohexylene or 1,2-phenylene.

6. An azamethine according to claim 5, wherein W is ethylene or isopropylene.

7. An azamethine according to claim 1, wherein R is hydrogen.

8. An azamethine according to claim 1, wherein Y is methyl, ethyl, allyl, octyl or benzyl.

9. An azamethine according to claim 1 of formula

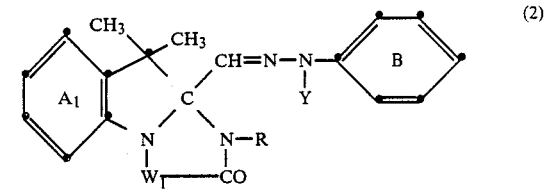

wherein the ring $A_1$ is unsubstituted or is substituted by halogen, cyano, lower alkyl or lower alkoxy, $W_1$ is ethylene, isopropylene, 1,2-cyclohexylene or 1,2-phenylene, and R, Y and B are as defined in claim 1.

10. An azamethine according to claim 9, wherein the ring $A_1$ is unsubstituted or is substituted by halogen, lower alkyl or lower alkoxy.

11. An azamethine according to claim 1 of formula

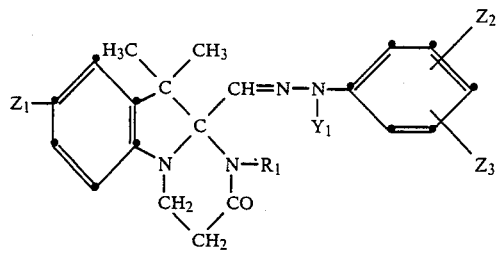 (3)

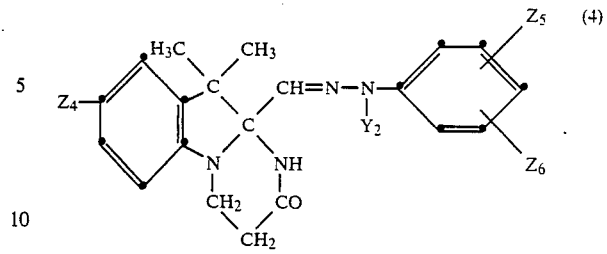 (4)

wherein
- $R_1$ is hydrogen, lower alkyl, phenyl or chlorophenyl,
- $Y_1$ is $C_1$–$C_8$alkyl, allyl, benzyl or phenethyl,
- $Z_1$ is hydrogen, halogen, $C_1$–$C_3$alkoxy or $C_1$–$C_4$alkyl,
- $Z_2$ is hydrogen, cyano, halogen, $C_1$–$C_5$alkoxy, $C_2$–$C_8$alkoxyalkoxy or $C_1$–$C_{12}$alkyl, and
- $Z_3$ is hydrogen, halogen, $C_1$–$C_5$alkyl or $C_1$–$C_5$alkoxy.

12. An azamethine according to claim 11 of formula wherein
- $Y_2$ is methyl, ethyl, N-octyl, allyl or benzyl,
- $Z_4$ is hydrogen or chlorine,
- $Z_5$ is hydrogen, chlorine, $C_1$–$C_4$alkoxy, $C_1$–$C_{12}$alkyl or $C_2$–$C_8$alkoxyalkoxy and
- $Z_6$ is hydrogen, chlorine or methyl.

13. The azamethine of claim 12, wherein $Y_2$ is methyl or benzyl and $Z_4$, $Z_5$ and $Z_6$ are hydrogen.

* * * * *